Oct. 4, 1955    F. P. RODWICK    2,719,479
ELECTRIC TOASTER
Filed Oct. 27, 1951    4 Sheets-Sheet 1
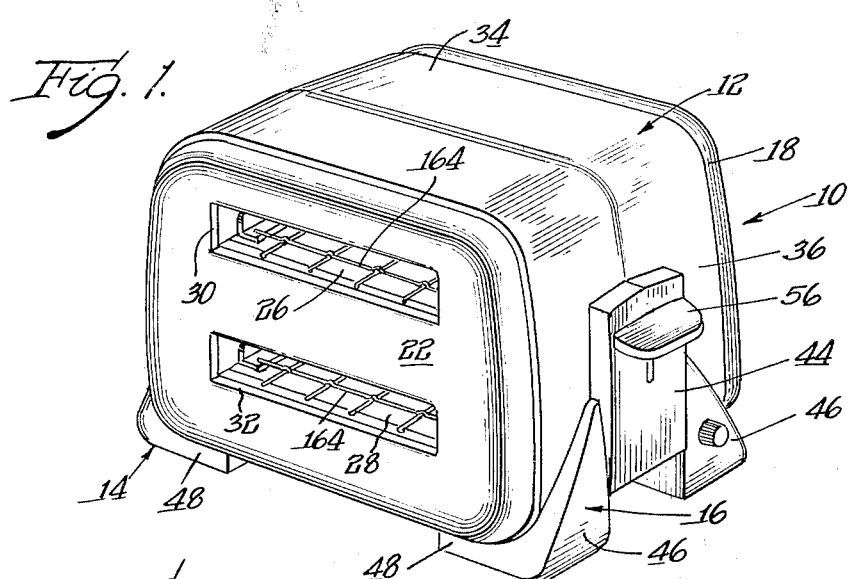
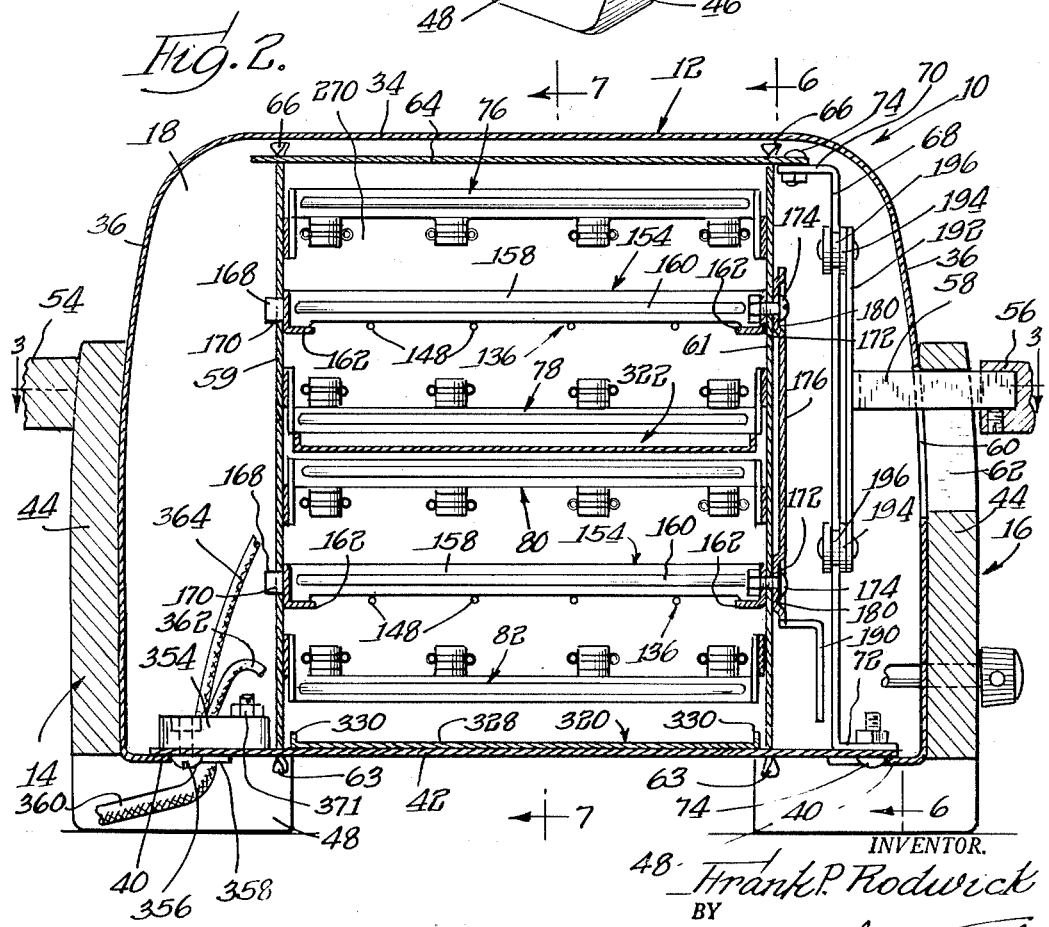
INVENTOR.
Frank P. Rodwick
BY
Moore, Olson & Trexler
attys.

Oct. 4, 1955  F. P. RODWICK  2,719,479
ELECTRIC TOASTER
Filed Oct. 27, 1951  4 Sheets-Sheet 2
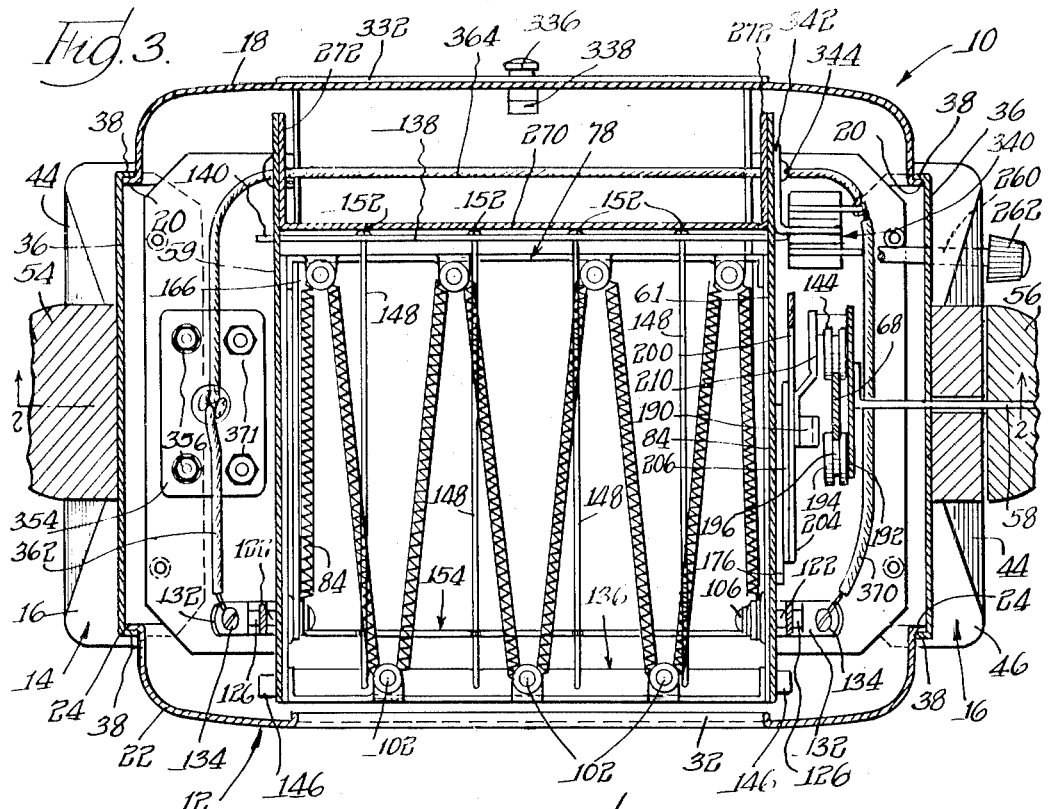
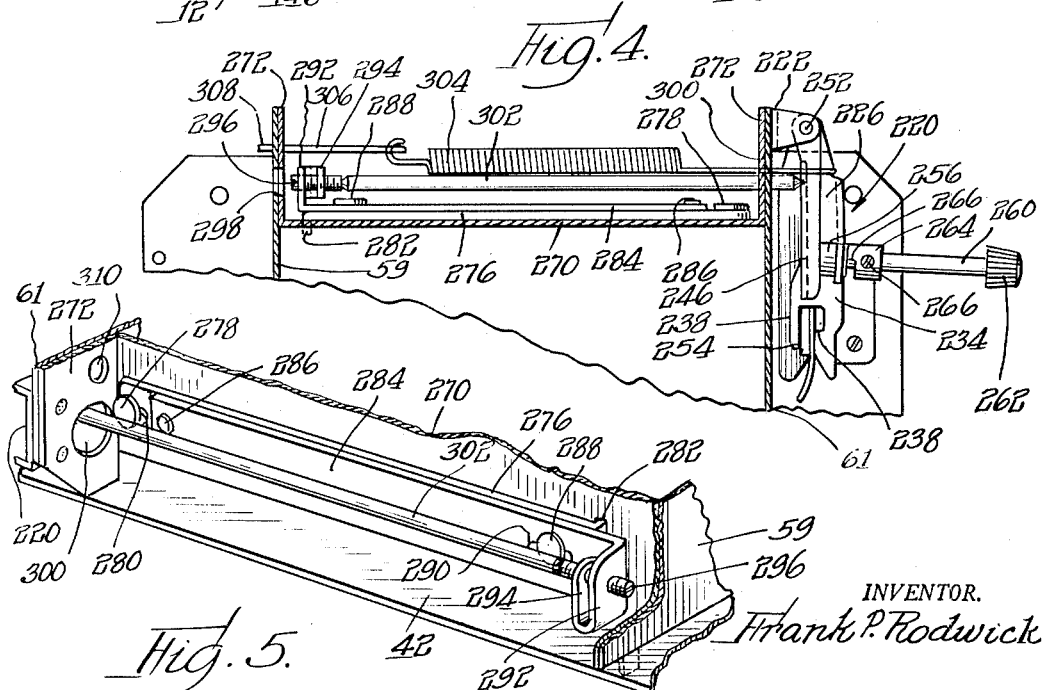
INVENTOR.
Frank P. Rodwick
By: Moore, Olson & Trexler
Attys.

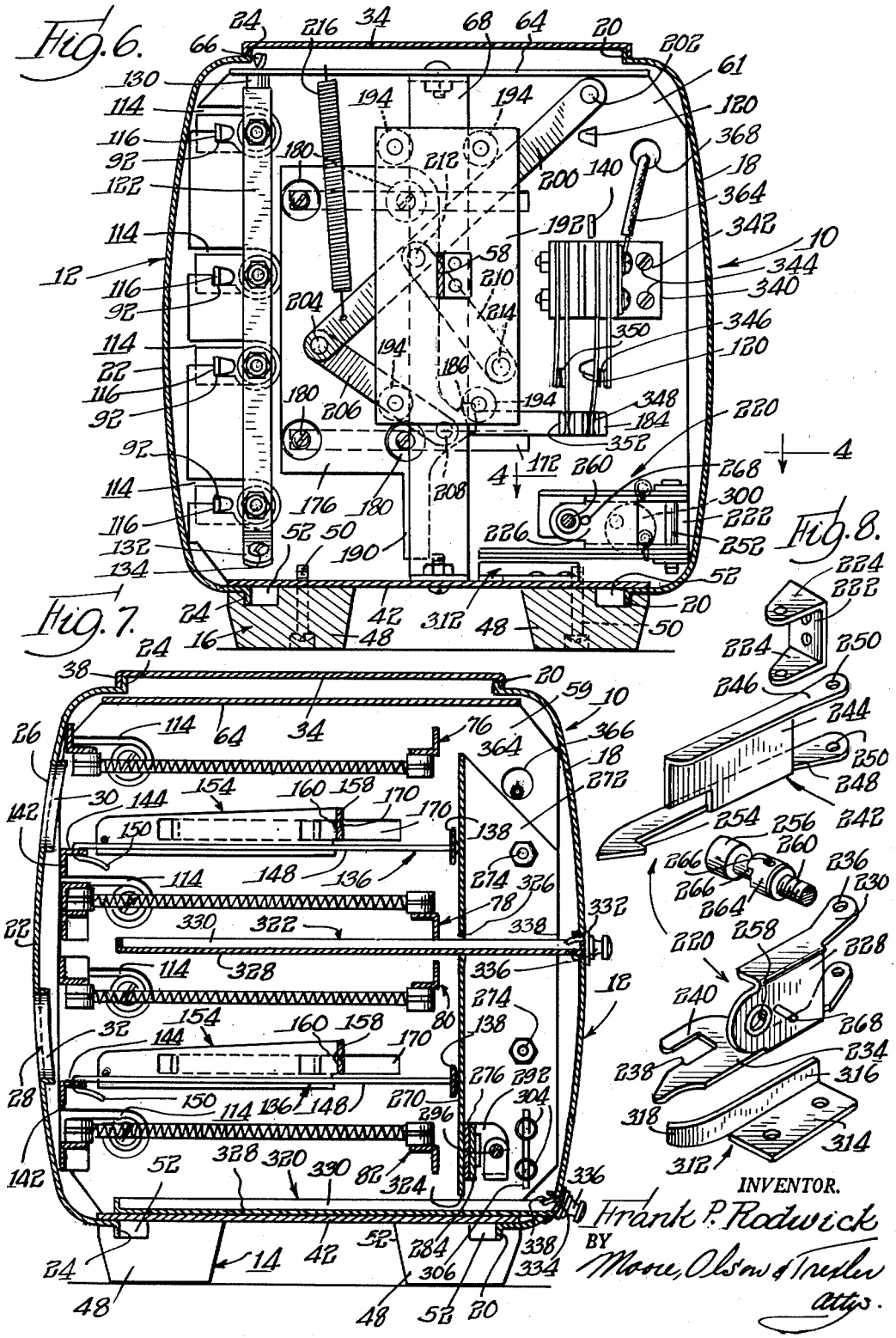

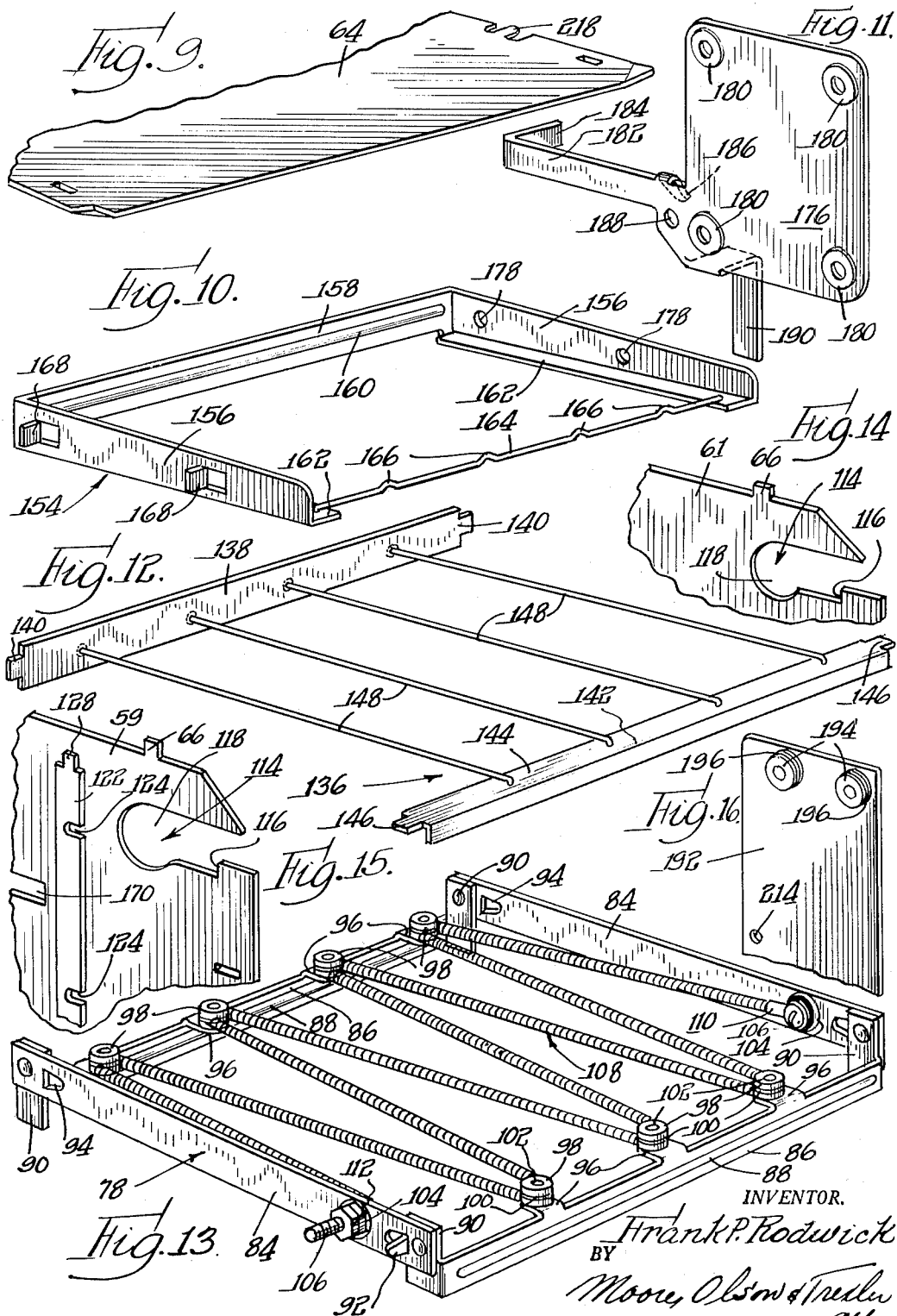

United States Patent Office

2,719,479
Patented Oct. 4, 1955

2,719,479

ELECTRIC TOASTER

Frank P. Rodwick, Chicago, Ill., assignor, by mesne assignments, to The Silex Company, Hartford, Conn., a corporation of Connecticut Application October 27, 1951, Serial No. 253,523

6 Claims. (Cl. 99—391)

This invention is concerned generally with an electric cooker and more particularly with an electric toaster.

The broad object of this invention is to provide a toaster for toasting relatively flat articles of food such as bread in a horizontal position.

Another object of this invention is to provide a toaster with horizontally disposed heating elements having relatively large open areas to allow droppings from the food article being toasted to fall through.

An object of this invention is to provide means for shifting an article horizontally from partially inserted position into fully inserted toasting position.

Another object of this invention is to provide means as set forth in the foregoing object wherein the article shifting means is provided with a large open area to allow toasting therethrough.

Yet another object of this invention is to provide, in a toaster for toasting bread or the like in horizontal position, means for shifting the edge of the bread or the like out of the toaster at the end of a toasting operation.

A further object of this invention is to provide, in a toaster for toasting bread or the like in horizontal position, means for shifting the bread or the like horizontally into toasting position in response to vertical movement of a control member.

A still further object of this invention is to provide a toaster for toasting bread or the like in horizontal position and having a plurality of toasting levels and a plurality of removable trays for catching droppings from the bread or other articles being toasted.

Yet another object of this invention is the provision of a toaster for toasting bread or the like in horizontal position wherein the toaster is divided into two chambers by a removable tray for catching droppings from the top chamber.

This invention contemplates the provision of a toaster for toasting relatively wide, flat articles such as bread slices in horizontal position. The toaster is particularly adapted to toasting open face sandwiches wherein the sandwich spread or filling material must always be above the bread slice. A removable crumb tray separates the toaster into a pair of chambers and a second crumb tray is provided below the lower chamber. The upper face of the lower tray, both faces of the upper tray demarcating the two chambers, and the lower face of the top of the upper toaster chamber serve as reflectors to augment the toasting effect of the heating coils. The toasting elements comprise heating coils arranged horizontally in zigzag fashion and supported only at the various angular junctions to provide clearance for droppings such as crumbs from the articles being toasted.

The invention further contemplates the provision of a carrier for shifting bread or the like between partially inserted and toasting positions in response to a downward push on an operating handle. It is apparent that it would be undesirable to have to shift a handle horizontally as the toaster would tend to skid along a supporting surface and a user might well be burned in an attempt to stop such skidding.

Other and further objects and advantages of the present invention will be apparent from the following description when taken in connection with the accompanying drawings wherein:

Fig. 1 is a perspective view of a toaster embodying the principles of my invention;

Fig. 2 is a longitudinal sectional view of the toaster taken along the line 2—2 of Fig. 3;

Fig. 3 is a horizontal sectional view taken substantially along the line 3—3 of Fig. 2;

Fig. 4 is a detailed top view of the latch mechanism taken along the line 4—4 of Fig. 6;

Fig. 5 is a perspective view of the thermostatic control element;

Fig. 6 is a view partially in section substantially along the line 6—6 of Fig. 2 showing the actuating and switch mechanisms;

Fig. 7 is a vertical sectional view taken substantially along the line 7—7 of Fig. 2;

Fig. 8 is an exploded perspective view of the latch mechanism;

Fig. 9 is a fragmentary perspective view of the top plate of the upper toasting chamber;

Fig. 10 is a perspective view of one of the toast carrying trays;

Fig. 11 is a perspective view of the slide plate;

Fig. 12 is a perspective view of one of the grilles.

Fig. 13 is a perspective view of one of the heating elements;

Figs. 14 and 15 are fragmentary perspective views of the end plates; and

Fig. 16 is a fragmentary perspective view of the actuating plate.

A toaster 10 embodying the principles of my invention includes a sheet metal body portion 12 and end supports 14 and 16 of plastic or other suitable heat insulating material. The body portion 12 includes a dished out, generally rectangular back 18 having a peripheral flange 20 (Figs. 3, 6 and 7). The body 12 further is provided with a front section 22 generally similar to the rear section 18 and having an outwardly directed peripheral flange 24. The front section 22 further is provided with upper and lower rectangular apertures 26 and 28 respectively defined by inwardly directed peripheral flanges 30 and 32.

A central or retaining body portion comprises a top or roof section 34 formed integrally with end sections 36. The longitudinal edges of the central or retaining body portion are provided with inturned flanges 38 which interlock with the peripheral flanges 20 and 24 on the back and front sections respectively to hold the body together.

The lower ends of the end portions 36 of the central or retaining portion of the body are inturned as at 40 and are secured by means such as screws (not shown) to a bottom or base plate 42.

The end portions or members 16 and 14 include upstanding central sections 44 and depending legs 46 which have feet 48 fitting beneath the toaster body 12. Screws 50 pass through the feet 48 and are threaded into the plate 42 to secure the end pieces on the body. The feet are slotted longitudinally at 52 (Figs. 6 and 7) for cooperation with the peripheral flanges 20 and 24 on the back and front respectively. A handle 54 is fixed on the upstanding portion 44 of the end member 14 and a similar handle 56 is shiftably mounted on an actuating arm 58 extending through a vertical slot 60 in the end section 36 of the body portion and a slot 62 in the upstanding end section 44.

A pair of end plates 59 and 61 is secured to the bottom plate 42 by means such as tabs 63 extending through slots in the bottom plate and twisted. The end plates 59 and 61 extend nearly to the top 34 of the toaster body at which point a top plate 64 is secured by means of twisted tabs 66 extending through slots in the top plate 64. A metal strip serving as a guide 68 is provided with deflected ends 70 and 72 respectively connected, by means such as nuts and bolts 74, to the top plate 64 and the bottom plate 42. This guide 68 serves to brace the structure to which it is connected and further acts as a guide for the actuating links as will be apparent shortly.

Four heating units 76, 78, 80 and 82 are arranged in pairs as best may be seen in Figs. 2 and 7. The heating elements are identical and the structure best will be understood with reference to Fig. 13 showing the heating element 78 as well as with reference to Figs. 2, 3 and 7. Such heating element comprises end spacers 84 to which are riveted front and back supports 86. Both of the spacers and both of the front and back supports include flat metal strips arranged in vertical planes and the front and back supports are longitudinally ribbed at 88 for rigidity. The front and back supports are provided with inturned and upstanding flanges 90 by means of which the spacers 84 are riveted to them and displaced upwardly therefrom. The spacers 84 are provided with struck out tabs 92 near their front ends for purposes hereinafter to be discussed and are provided near their rear ends with punched out apertures 94 similar to those left by the struck out tabs 92.

The front and rear supports 86 are provided with inwardly directed, horizontal mounting tabs 96, and insulators 98 provided with peripheral grooves 100 are secured thereon by pins 102.

Circular displaced sections 104 are provided near the fronts of the spacers 84 and screws 106 are passed therethrough and are insulated from the spacers 84 by washers and bushings of mica or other heat resistant insulating material. The ends of a resistance heating element 108 made of material such a nichrome are secured to eyes 110 which are secured beneath the heads of the screws 106. A pair of nuts 112 is threaded on the outer end of each screw 106 to clamp the eyes under the heads and further to act as spacers as will be apparent hereinafter. The nuts 112 and the eyes 110 also are insulated from the spacers 84 as will be obvious. The heating element 108 is in the form of a helical coil arranged in zig-zag fashion between the screws 106 and the various insulators 98. This arrangement of the heating elements provides relatively large free areas between adjacent coil sections and therefore allows room for crumbs or the like to drop through so that the crumbs or other droppings will not be burned to cause unpleasant odors and coat the heating element. The heating element preferably is uncurled at each angular junction where it is received in an annular peripheral groove 100 of an insulator 98.

The end plates 59 and 61 are provided with four spaced recesses 114 (Figs. 6, 7, 14 and 15). Each of the recesses is provided with a shoulder 116 near the front and an enlarged substantially circular portion 118 at the rear of the recess. The heating elements 76, 78, 80 and 82 are mounted between the end plates 59 and 61 placing the tabs 92 against the shoulders 116 as best seen in Fig. 6 and fitting four inwardly projecting tabs struck out near the rear of each end plate at 120 into the apertures 94 in the spacers 84.

The circular portions 118 of the recesses 114 provide clearance for the nuts 112 on the heating elements and the four screws on either side of the heating elements are interconnected by bus bars 122 formed with slots 124 (Fig. 15) to facilitate sliding the bus bars sidewise over the screws 106 where they are spaced from the spacer strips 84 by the nuts 112 and secured by additional nuts 126 (Fig. 3). The upper ends of the bus bars 122 are provided with upwardly extending tabs 128 (Fig. 15) over which are placed ceramic insulators 130 (Fig. 6) to maintain the upper portions of the bus bars away from the end plates 59 and 61 and the top plate 64. The lower ends of the bus bars 122 are deflected outwardly at 132 and have screws 134 threaded into them to secure connecting wires.

Two supporting grilles 136 (Figs. 2, 3, 7 and 12) are carried by the end plates 59 and 61, each of the grilles being mounted slightly above the lower end of each pair of heating elements, these being the heating elements 78 and 72. Each grille comprises a rear horizontal supporting bar 138 arranged in a vertical plane and secured to the end plates 59 and 61 by longitudinally extending tabs 140 fitting through vertical slots in the end plates. Each grille 136 further includes a forward support 142 comprising an angle member having a horizontal flange 144. Longitudinally extending tabs 146 on the horizontal flange fit through slots in the end plates 59 and 61 to mount the front supports 142. Each grille 136 is completed by a plurality of transverse wires 148 having hooked front ends 150 fitting through apertures in the horizontal flange 144 of the front support 142. The rear ends of the wires 148 fit through apertures in the rear supporting strip 138 and may be provided with buttons 152 as shown in Fig. 3 to prevent the wires from coming out of the apertures.

Two shiftable toast carrying trays 154 (Figs. 2, 3, 7 and 10) are provided in substantially horizontal alignment with the grilles 136. Each toast carrying tray comprises an integral metal frame having forwardly extending side arms 156 and a rear abutment member 158. Each abutment member 158 is provided with a longitudinal rib 160 for rigidity and the arms 156 are provided with inwardly directed horizontal flanges 162. A front toast supporting wire 164 extends between the front corners of each pair of inwardly directed flanges 162. The wire 164 is provided with upwardly offset portions 166 to provide clearance for the grille wires 148 and the ends of the wire are hooked through apertures in the flanges 162. It is apparent that additional wires could be spaced along the flanges 162 in spaced parallel relation with the wire 164, but I have found that such additional wires generally are unnecessary.

One of each pair of arms 156 is provided with struck out, outwardly directed tabs 168 which fit through horizontal slots 170 (see also Fig. 15) in the end plate 59. Similar slots 172 are provided in the end plate 61 and screws 174 pass through a slide plate 176 and through apertures 178 in the adjacent arm 156 slidably to carry that arm on the end plate. The toast carrying members 154 are supported with the horizontal flanges 162 slightly below the level of the grille wires 148 and with the front wire 164 overlying the wires 148 by virtue of the raised portions 156.

The slide plate 176 is best seen in Figs. 6 and 11 and comprises a substantially rectangular sheet metal section having indented portions 180 adjacent each corner which bear against the end plate 61 adjacent the slot 172 to reduce friction between the plates 161 and 176. The screws 174 previously referred to fit through apertures in these indented portions.

A switch actuating arm 182 projects rearwardly from the slide plate 176 and in the plane of this slide plate and is provided at its rear end with a right angularly disposed switch actuating finger 184. On the arm 182 near its junction with the main part of the slide plate 176 is an integral bent over switch actuating finger 186, and substantially directly below this finger is an aperture 188 for connection to an actuating link hereinafter to be described. The slide plate 176 is completed by an outwardly and downwardly extending latch member 190.

An actuating plate 192 (Figs. 2, 3, 6 and 16) of rectangular configuration is provided with four rollers 194 rotatably mounted near the corners of the plate. The rollers are provided with peripheral kerfs 196 and the guideway 68 fits between pairs of the rollers and in the kerfs so that the actuating plate 192 may be shifted up and down on the guideway. The actuating arm 58 heretofore mentioned is provided with an angularly disposed foot 198 which is riveted, welded, or otherwise suitably secured to the actuating plate 192 to force the plate down.

A relatively long link 200 (Figs. 3 and 6) is pivoted to the end plate 61 at 202 near the upper rear corner thereof. The link is pivoted at its lower end at 204 to a relatively short link 206 and the short link 206 is pivoted at its lower end to the slide plate 176 at 208. A second short link 210 is pivotally connected to the long link 200 at 212 somewhat displaced toward the lower end of this link from the center thereof. The link 210 is pivotally connected at 214 to the actuating plate 192 near the lower rear corner thereof, the link 210 being provided with an offset portion intermediate its ends and having a spacer positioned between its lower end and the actuating plate 192 to provide clearance for the switch actuating finger 186, the link 206 and the guideway 68. A coil spring 216 is stretched between a detent 218 (Fig. 9) on the top plate 64 and the link 200 near the lower end thereof so as normally to urge the link 200 upwardly. Downward movement of the actuating plate 192 pulls the link 210, and hence the link 200 down against the action of spring 216, and this forces the link 206 rearwardly of the toaster and slides the slide plate 176 rearwardly. This shifts the toast carrying trays 154 horizontally rearwardly into the toaster.

The slide plate 176 is retained in its rearmost position by a latch mechanism 220 best seen in Figs. 4, 6 and 8. The latching mechanism 220 includes a bracket 222 riveted or otherwise secured to the end plate 61 near the rear bottom corner thereof. The bracket 222 has spaced apart parallel ears 224 between which the remainder of the latching mechanism is pivoted. The latching mechanism 220 further includes a main or primary keeper 226 having a flat central body portion 228 and side flanges 230 and 234 formed integral therewith and at right angles thereto. Corresponding ends of the side flanges are apertured at 236 and the primary keeper is pivotally connected to the ears 224 of the bracket 222. The lower flange 234 is provided with a locking shoulder 238 and an oppositely disposed guard finger 240.

An auxiliary or secondary keeper 242 is provided with a central body portion 244 and with upper and lower flanges 246 and 248 directed at right angles to the central body portion and oppositely from one another. Corresponding ends of the flanges are apertured at 250 and the auxiliary keeper 242 is pivotally connected to the bracket ears 224 on a common pin 252 with the primary keeper 226. The lower flange 248 of the auxiliary keeper is provided with a locking shoulder 254 directed oppositely from the locking shoulder 238 and located a greater distance from the pivot pin 252 than the locking shoulder 238. The shoulder 254 may be omitted for certain purposes as hereinafter described.

A threaded nut member 256 is secured to the center section 228 of the primary keeper 226 by any suitable means such as a reduced neck portion on the nut fitting through an aperture 258 in the center section 228 and peened over. An adjusting rod 260 having a knurled control knob 262 on its outer end is threaded through the nut member 256 for abutment against the center section 244 of the auxiliary keeper 242. A stop member 264 having an axially extending abutment portion 266 is threaded on the adjustment rod 260 and locked in adjusted position by means such as a set screw 266. A limit pin 268 extends from the center section 228 of the primary keeper for engagement with the abutment portion 266 to limit rotative adjustment of the adjusting rod 260.

The toasting chambers of the toaster are provided with a rear plate 270 having rearwardly directed flanges 272 and these flanges are secured to the end plates 59 and 61 by a plurality of nuts and bolts 274, by the rivets or screws holding the bracket 222, and by other screws holding the switch mechanism as will appear shortly. A metal strip 276 (Figs. 3–5 and 7) having a relatively high coefficient of thermal expansion is secured to the rear plate 270 near the bottom thereof by means of a rivet 278 sliding in a slot 280 at the end of the strip adjacent the latching mechanism 220 and by a right angled flange 282 at the other end of the strip having retaining ears and received in a slot in the rear plate 270. A second strip 284 having a relatively low coefficient of thermal expansion is fixed by means such as a rivet 286 to the first strip 276 near the end having the slot 280. A rivet 288 near the other end of the first strip 276 is slidingly received in a slot 290 in the second strip 284 to hold the strips together at the opposite end.

The second strip 284 is provided at the end adjacent the slot 290 with a right angularly directed flange 292 bent upwardly upon itself to form a confronting flange portion 294. An adjusting screw 296 having a concave end is threaded through aligned apertures in the flanges 292 and 294 and an aperture 298 is provided in the end plate 59 and flange 272 in alignment with the screw 296 for adjustment thereof. An aperture 300 is provided in the end plate 61 and flange 272 in alignment with the screw 296 and a rod 302 extends through the aperture 300 and between the center section 244 of the auxiliary keeper and the adjusting screw 296, the ends of the rod being pointed and received in the concave end of the adjusting screw 296 and in an indent in the back of the auxiliary keeper center section 244. The primary and auxiliary keepers are pulled toward the rod 302 by a pair of springs 304 stretched between a bracket 306 fitting through a slot in the end plate 59 and flange 272 and retained in position by upwardly and downwardly extending ears 308. The lowermost of the pair of springs extends through the aperture 300 accommodating the rod 302 and has its end looped over the auxiliary keeper 242. A hole 310 is provided in the flange 272 and end wall 61 to accommodate the second of the pair of springs 304 which has its end looped over the primary keeper 226.

The latch member 190 on the slide plate 176 is adapted to be held by the keepers as will be apparent hereinafter. In order properly to guide the latch member 190, there is provided a guide shoe 312 (Figs. 6 and 8) having a flat mounting flange 314 and a guide flange 316 having a curved deflected end 318. The mounting flange 314 is secured to the bottom plate 42 by a pair of screws or any other suitable means.

The back 18 of the toaster is provided with a slot above the level of the bottom plate 48 and with another slot intermediate the heating units 78 and 80 to accommodate a pair of crumb trays 320 and 322. The rear plate 270 is cut out near the bottom thereof at 324 and is slotted in alignment with the upper slot in the back of the toaster at 326 to accommodate the crumb trays. Both crumb trays 320 and 322 comprise flat metal sheets 328 and have peripheral flanges 330 directed upwardly at right angles relative thereto on three sides the trays further are provided at their rear ends with upwardly directed flanges of greater heights than the slots in the back of the toaster, the flange 332 of the upper tray 322 being at right angles to the sheet 328 and the flange 334 of the lower crumb tray 320 being at an angle greater than a right angle relative to the sheet 328 and slightly curved in order that both of the flanges may conform closely to the contours of the toaster back 18 while limiting movement of the trays into the toaster. Each of the crumb trays 320 and 322 is provided with a knob 336 to facilitate withdrawal thereof. The lower crumb tray is supported by the bottom plate 42 while the upper crumb tray is supported by the bottom edge of the slot 326 and by the aligned slot in the toaster back 18. Each of the trays further is provided with a spring latching finger 338 directed upwardly from one of the flanges 332, 334 adjacent the knobs 336.

A switch mechanism 340 (Figs. 3 and 6) is mounted on the end plate 61 adjacent the actuating plate 192 and includes a mounting flange 342 secured to the end plate by screws 344. The switch mechanism includes a pair of contacts 346 tending toward contacting relation but held apart by the switch actuating finger 184 on the arm 182 of the slide plate 176, the finger 184 contacting an insulating button 348 on the lower end of one of the switch contact arms. A second pair of switch contacts 350 is normally in engagement, and disengagement of these contacts is effected by abutment of the finger or detent 186 against an insulating button 352 on one of the arms carrying the switch contacts 350.

A ceramic block 354 is secured to the bottom plate 42 near one end thereof by nuts and screws 356 and has a bushing 358 extending through the bottom plate to accommodate an electric cord 360. One of the wires 362 of the cord 360 leads directly to the screw and flange connector 134, 132 of the bus bar or strip 122 and the other wire 364 leads through an aperture 366 in the end plate 59, through an aperture 368 in the end wall 61 which is above the switch mechanism 340. The wire 364 then is connected to one of the arms carrying the switch contacts 346 and the other arm is connected with a wire 370 leading to the screw and flange connector 134, 132 of the bus bar 122. In this particular arrangement, the switch contacts 350 are not used and the locking shoulder 254 is omitted, but various wiring arrangements are known in the toaster art whereby a resistor is placed in series with the heating coils after completion of a toasting operation to maintain the coils heated to a low temperature to keep the toast warm, and it is contemplated that a known wiring arrangement of this type could be utilized including the second set of contacts 350. Bolts and nuts 371 are provided on the insulating block 354 and these may secure fasteners attached to the wires 362 and 364 to preclude strain on the electrical connections.

The invention herein described has particular applicability for toasting open face sandwiches such as cheese sandwiches which may have bacon strips on their top surfaces. To toast a sandwich of this or any other type, the sandwich is slid in on top of either of the grilles 136 until it abuts the abutment member 158 of the toast carrier 154. The dimensions of the toaster are such that the sandwich at this time will protrude slightly from the front of the casing. The handle 56 then is forced down and the other handle 54 may be utilized to steady the toaster as desired, although this generally will not be found to be necessary. The forcing down of the handle 56 lowers the actuating plate 192 on the guideway 68 and this pulls the link 210 down, pivots the link 200 in a counterclockwise direction against the action of spring 216 as seen in Fig. 6, and this forces the link 206 and slide plate 176 toward the rear of the toaster. Movement of the slide plate to the rear of the toaster shifts the toast carrying trays 164 rearwardly to carry the sandwich or the like completely into the toaster between opposed pairs of heating elements. The sandwich or the like readily slides longitudinally along the wires 148 of the grille whereas there is little tendency for the sandwich or the like to move transversely relative to the toast carrier wire 164. The raised portions 166 of the wire 164 materially aid in moving the sandwich with the wire.

As the slide plate 176 moves rearwardly, the switch actuating finger 184 moves away from the insulating button 348 and the switch contacts 346 close to energize the heating coils of the toaster. The latch member 190 passes between the primary and auxiliary keepers 226 and 242 and remains caught behind the locking shoulder 238 of the primary keeper. As the toaster heats, the metal strip 276 of relatively high coefficient of thermal expansion expands and the left end (as viewed in Fig. 5) of the strip slides farther to the left in the sliding connection and drags the left end of the strip 284 along with it. As the strip 284 has a relatively low coefficient of thermal expansion, its right end is shifted toward the left and forces the rod 302 to the left against the secondary keeper 242. The center section 244 of the secondary keeper acts through the adjusting rod 260 abutting against it to pivot the primary keeper to retract the shoulder 238 from locking engagement with the latch member 190 so that the slide plate 176 is free to slide forwardly under the influence of the spring 216. Such forward movement disengages the contacts 346 to deenergize the toasting coils and shifts the toast carriers 154 forwardly of the toaster to expose the edge of the toasted sandwich so that the sandwich readily can be removed from the toaster without damage to the user's fingers.

With the simple wiring arrangement shown the locking shoulder 254 on the auxiliary keeper is omitted. It has been mentioned heretofore that wiring arrangements are known in the art whereby a resistor is placed in series with the toasting coils to lower the temperature thereof and thus maintain the toast warm with little or no further toasting. With this type of wiring arrangement the auxiliary keeper locking shoulder 254 is used as shown, and this shoulder catches the latching member 190 after the latching member has moved from the primary keeper locking shoulder 238. This movement of the latching member and the corresponding movement of the slide plate 176 is sufficient to move the switch actuating finger or detent 186 away from the insulating button 352 to allow closing of the switch contacts 350, the switch contacts 346 at this time remaining closed. Upon cooling of the toaster due to the lowered temperature of the heating coils the metal strip 276 contracts to shift the entire strip 284 to the right. This allows the spring 304 engaging the secondary keeper 342 to pivot the same to release the latching member 190 from the locking shoulder 254 to release the latching member 190 completely. This brings the toasting operation to a stop as will be obvious.

The spacing between the auxiliary and primary keepers, and hence the time when the latching member 190 will be released by the shoulder 238 is determined by the setting of the control rod 260 as will be apparent. It will be seen then that the toasting operation is under adjustable thermostatic control.

Any crumbs or other droppings from the sandwiches or the like being toasted fall through the relatively large open areas of the heating units or elements with very little tendency to collect on the coils where they would burn to cause unpleasant odors and damage the heating coils. The crumbs or other droppings collect on the crumb trays 320 and 322 which readily are withdrawn to remove the crumbs or other droppings. The upper of the two trays divides the toaster into two chambers neither of which is affected by radiant energy from the other and both trays as well as the top plate serve as reflectors to augment the direct radiation from the heating coils. The toast carrying trays shift the sandwiches or the like between toasting position and a readily accessible position extending partially from the toaster casing. The horizontal shifting of the trays between these positions is effected by vertical reciprocation of an actuating handle without the tendency to shift the position of the toaster that would be present with a horizontally operated handle.

Obviously many changes can be made in the mechanical details of the embodiment of this invention shown and described in the foregoing specification and drawings. My invention therefore is not to be limited except as expressed in the following claims.

I claim:

1. An electric toaster for receiving and toasting relatively wide and flat articles in horizontal position and operable substantially without tendency to slide on its supporting surface, said toaster comprising a casing having a plurality of openings in one side thereof for receiving such articles in horizontal position, a plurality of pairs of substantially flat electrical toasting units, means for supporting said plurality of pairs of toasting units in spaced apart horizontal position within said casing, each pair of units being spaced on opposite sides of one of said openings, a plurality of carriers each carried in horizontal position between a pair of said toasting units, means defining a plurality of guideways for guiding said carriers in horizontal reciprocation, a horizontally reciprocable member connected to said carriers for horizontally reciprocating said carriers, a substantially vertical guide strip, a vertically reciprocable member, means slidably interconnecting said vertically reciprocable member and said substantially vertical guide strip, means interconnecting said horizontally reciprocable member and said vertically reciprocable member for horizontally reciprocating the former to shift the carriers between receiving and toasting position in response to vertical reciprocation of the latter and an operating member connected to said vertically reciprocable member for actuating the same and guided for vertical movement generally normal to the bottom of the casing whereby to substantially eliminate tendency of the toaster to slide on its supporting surface.

2. An electric toaster as claimed in claim 1, wherein the means interconnecting the horizontally reciprocable member and the vertically reciprocable member includes an angularly disposed arm connected to said horizontally reciprocable member and operatively connected to a pivoted member on said vertically reciprocable member.

3. An electric toaster as claimed in claim 2, wherein the angularly disposed arm and the pivoted member are in the form of levers interconnected by an additional operating lever.

4. An electric toaster as claimed in claim 1, wherein the carriers comprise frame means with grill wires traversing the same and at least one wire crossing the grill wires and having spaced upwardly offset portions overlying the grill wires.

5. An electric toaster as claimed in claim 1, wherein the means slidably interconnecting the vertically reciprocable member and the vertical guide strip comprises kerfed rollers carried by said vertically reciprocable member for engagement with the vertical guide strip.

6. An electric toaster for receiving and toasting relatively wide and flat articles in horizontal position, said toaster comprising a casing having an opening in one side thereof for receiving said articles in horizontal position, a pair of substantially flat electrical toasting units, means for supporting said toasting units in spaced apart horizontal position within said casing with the units spaced on opposite sides of said opening, a carrier carried in horizontal position between said toasting units, means defining a plurality of guideways for guiding said carrier in horizontal reciprocation, a horizontally reciprocable member connected to said carrier for horizontally recipocating the said carrier, a substantially vertical guide strip, a vertically reciprocable member, means slidtally reciprocating the said carrier, a substantially vertical and said substantially vertical guide strip, means interconnecting said horizontally reciprocable member and said vertically reciprocable member for horizontally reciprocating the former to shift the carrier between receiving and toasting positions in response to vertical reciprocating of the latter, and an operating member connected to said vertically reciprocable member for actuating the same and guided for vertical movement generally normal to the bottom of the casing whereby to substantially eliminate tendency of the toaster to slide on its supporting surface.

References Cited in the file of this patent

UNITED STATES PATENTS

| Number | Name | Date |
|---|---|---|
| 1,423,806 | Lebzetler | July 25, 1922 |
| 1,543,069 | Ellis | June 23, 1925 |
| 1,659,610 | Noeth et al. | Feb. 21, 1928 |
| 1,870,170 | Browning | Aug. 2, 1932 |
| 2,171,897 | Sardeson | Sept. 5, 1939 |
| 2,288,748 | Scharf | July 7, 1942 |
| 2,302,117 | Gomersall | Nov. 17, 1942 |
| 2,429,736 | Wales | Oct. 28, 1947 |
| 2,578,034 | Baltzell | Dec. 11, 1951 |
| 2,595,283 | Mueller | May 6, 1952 |